United States Patent [19]

Levy et al.

[11] Patent Number: 5,190,354

[45] Date of Patent: Mar. 2, 1993

[54] VEHICLE WHEEL COVER

[76] Inventors: Serge Levy, 4B, route du Saléve, 74240 Gaillard, France; Mustapha Alaoui Mrani, 33, boulevard de la Forêt, 1009 Pully, Switzerland

[21] Appl. No.: 791,315

[22] Filed: Nov. 14, 1991

[30] Foreign Application Priority Data

May 13, 1991 [EP] European Pat. Off. ............ 91440037

[51] Int. Cl.⁵ .................................................. B60B 7/00
[52] U.S. Cl. .................... 301/37.25; 301/37.1; 40/587
[58] Field of Search .............. 301/37 R, 37 N, 108 R; 40/587

[56] References Cited

U.S. PATENT DOCUMENTS

| 1,478,475 | 12/1923 | Jago et al. ................ 40/587 |
| 1,501,094 | 7/1924 | Braucher ................... 40/587 |
| 1,515,419 | 11/1924 | Smith . | |
| 2,130,220 | 9/1938 | Ball et al. ............ 301/37 N X |
| 2,762,469 | 9/1956 | Lyon ................... 301/37 N X |
| 2,869,262 | 1/1959 | Lucas ..................... 40/129 |
| 2,954,629 | 10/1960 | Matin ..................... 40/587 |
| 3,443,848 | 5/1969 | Philippot et al. . | |
| 3,749,463 | 7/1973 | Krapf . | |
| 4,341,035 | 7/1982 | Jaworski .............. 40/587 X |

FOREIGN PATENT DOCUMENTS

| 384399 | 11/1987 | Austria . |
| 468263 | 11/1928 | Fed. Rep. of Germany . |
| 8712675 | 2/1988 | Fed. Rep. of Germany . |
| 631899 | 12/1927 | France . |
| 1069953 | 7/1954 | France . |
| 485349 | 10/1953 | Italy ..................... 40/587 |
| 60-47701 | 3/1985 | Japan . |
| 192621 | 2/1923 | United Kingdom . |
| 854336 | 11/1960 | United Kingdom ............ 301/37 N |
| 8600738 | 1/1986 | World Int. Prop. O. ........ 301/37 N |

Primary Examiner—Russell D. Stormer
Attorney, Agent, or Firm—Young & Thompson

[57] ABSTRACT

Wheel cover for the wheel of a vehicle, comprising a securement and support device (1) secured to the hub (2) or to the rim (3) of the wheel (4) and a substantially flat shield element (5), mounted on the device (1) for rotation and having an asymmetric spacing of its mass relative to its axis of rotation (6), permitting the shield element (5) to maintain a fixed angular position relative to the horizontal, even during rotation of the wheel (4). The securement and support device (1) comprises a base plate (7) fixed to the hub (2) or to the rim (3) of the wheel (4) and a support shaft (9), of cylindrical shape, removably mounted on the base plate (7) and provided with an external circular abutment (17). There is a rotative connection between the securement and support device (1) and the shield element (5) comprised by a roller bearing (13) mounted on the support shaft (9) by an annular intermediate member (26) disposed adjustably between an internal ring (14) of the roller bearing (13) and the support shaft (9), and delimited by a perforated disk (27), whose diameter corresponds substantially to that of the internal ring (14).

9 Claims, 4 Drawing Sheets

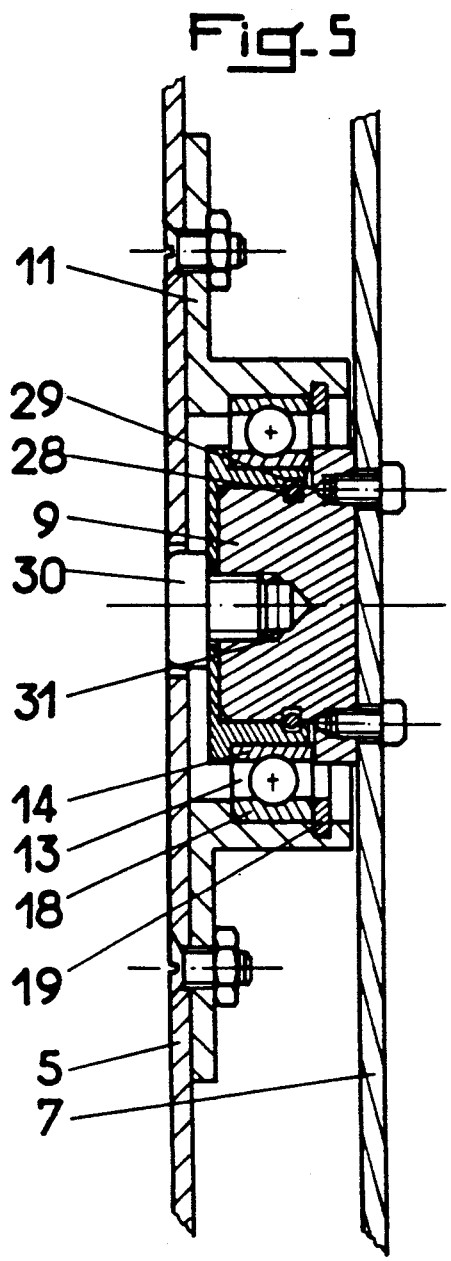
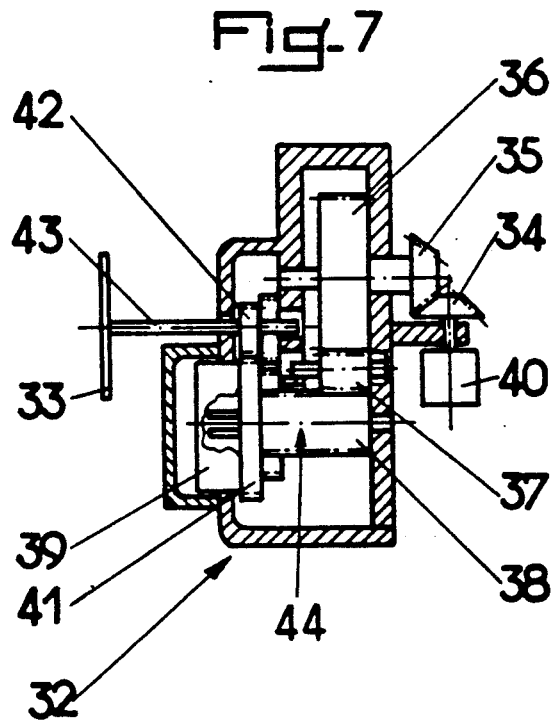
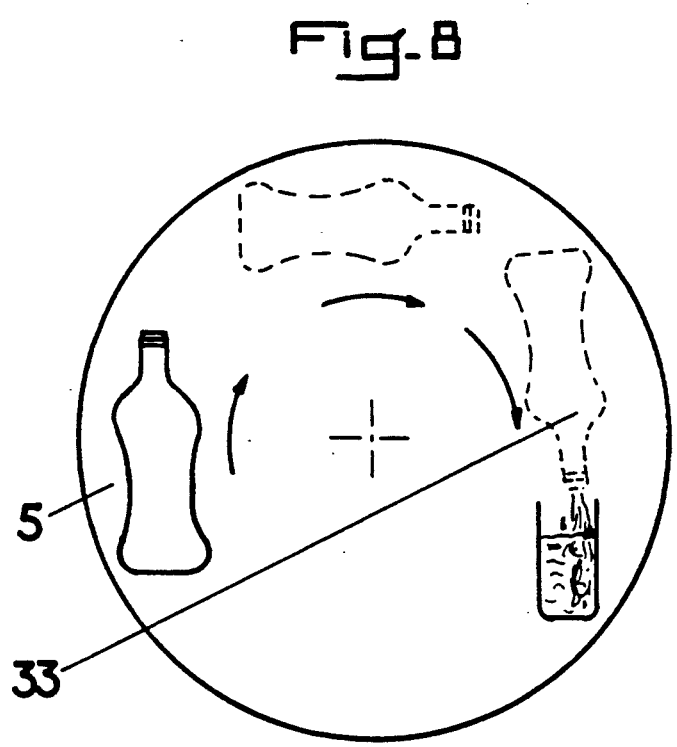

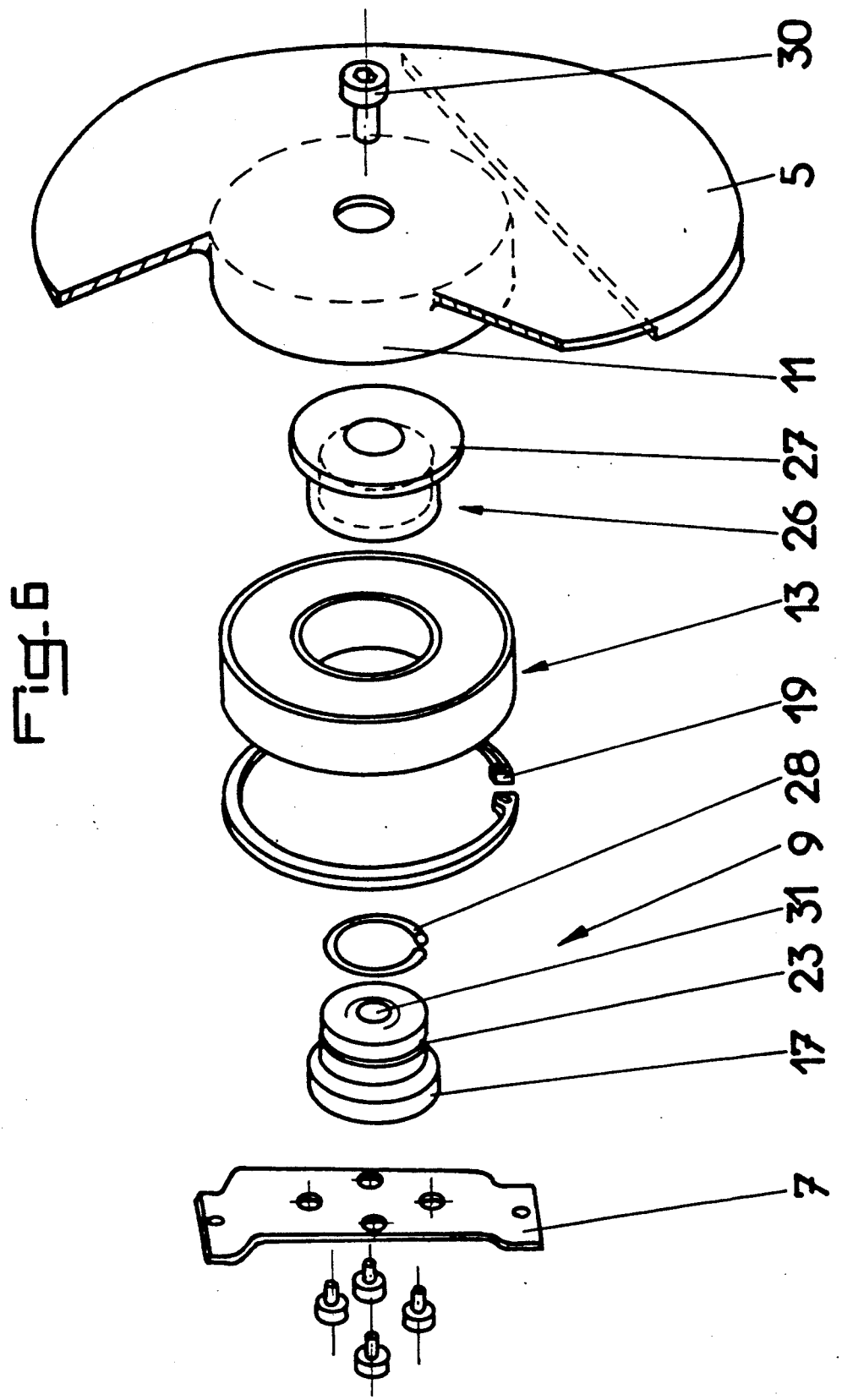

VEHICLE WHEEL COVER

The present invention relates to the field of vehicle accessories, particularly automobiles, and has for its object a vehicle wheel cover.

At present, most vehicles are provided with wheel covers on their wheels, which are generally adorned with decorative designs.

In certain cases, on the other hand, said wheel covers are preferably used as movable advertising signs, particularly in the case of service vehicles.

Nevertheless, because the wheel covers rotate with the vehicle wheels, the designs, symbols and/or advertising slogans and/or information cannot be discerned nor read by persons outside the vehicle when the latter moves and passes through their field of vision. Moreover, a recognition and/or easy reading of said designs, symbols and/or advertising texts and/or information when the vehicle is stopped, is possible only if the wheels of said vehicle have stopped in a given angular position corresponding to an upright position of the inscriptions on the wheel covers in question.

Furthermore, these latter generally cover only a portion of the total surface of the corresponding wheel rims.

There also exist wheel covers comprising decorative designs so rendered that they appear only when the corresponding wheel turns at a given speed of rotation, which leads to a very specific application and very limited utility.

The problem posed by the present invention is therefore to conceive a wheel cover for vehicle wheels which can serve particularly as an advertising support, and permitting recognition and/or reading of the designs, symbols and/or advertising texts and/or information, by persons outside the vehicle, no matter what the speed of said vehicle or respectively the position of its wheels when it is stopped.

Moreover, the wheel cover according to the invention should also, on the one hand, be constituted by a limited number of parts, on the other hand should have high reliability of mounting as well as good stability during rotation of the wheel and, finally, be assemblable with the corresponding vehicle wheel so as to permit the easy and rapid mounting and removal of the advertising support.

This problem is solved by the wheel cover according to the invention, characterized in that it is constituted principally, on the one hand, by a securement and support device fixed to the rim or the hub of a vehicle wheel and, on the other hand, by a substantially flat shield element, mounted rotatably on said device and having an asymmetric spacing of its mass relative to its axis of rotation, permitting the shield element to maintain a fixed angular position relative to the horizontal, even during rotation of said wheel.

The invention will be better understood from the following description, which relates to preferred embodiments, given by way of non-limiting example, and explained with reference to the accompanying schematic drawings, in which:

FIG. 5 is a side elevational and cross-sectional view of the wheel cover shown schematically in FIG. 1, according to a second embodiment;

FIG. 6 is an exploded perspective view of the wheel cover shown in FIG. 5;

FIG. 7 is a side elevational and cross-sectional view of an animation device which is part of the invention, and, FIG. 8 is a front elevational view of a shield element which is also part of the invention.

Figure 1:
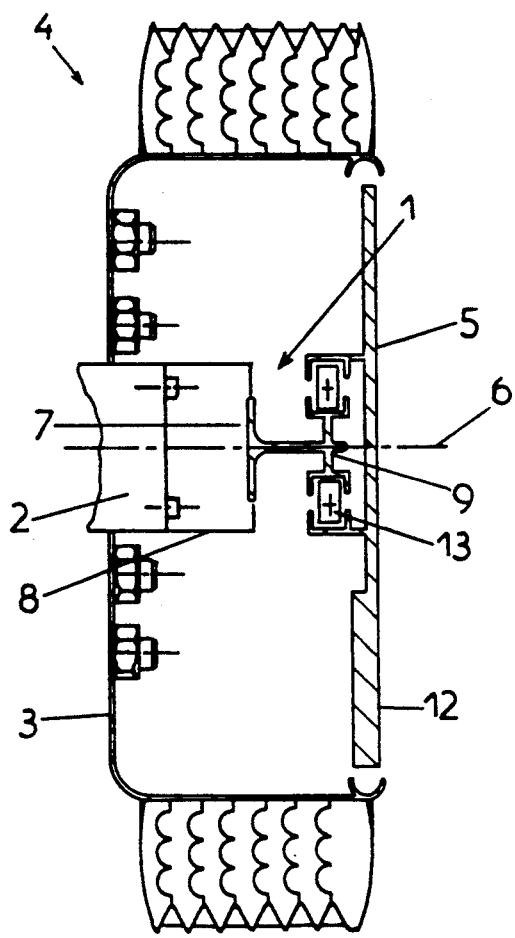
FIG. 1 is a schematic side view in elevation and cross section of the wheel cover according to the invention, mounted on a vehicle wheel.

According to the invention, and as shown in FIG. 1 of the accompanying drawings, the wheel cover is principally constituted, on the one hand, by a securement and support device 1 secured to the hub 2 or the rim 3 of a wheel 4 of a vehicle and, on the other hand, by a shield element 5, substantially flat, mounted on said device 1 for rotation and having an asymmetric spacing of its mass relative to its axis of rotation 6, permitting said shield element 5 to maintain a fixed angular position relative to the horizontal, even in case of rotation of said wheel 4.

Figure 3:
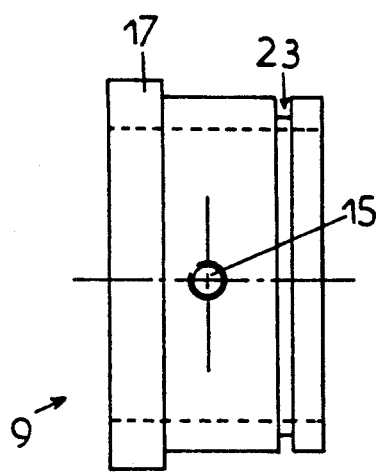
FIG. 3 is a side elevational view of the support shaft which is a part of the wheel cover shown in FIG. 2.
Figure 2:
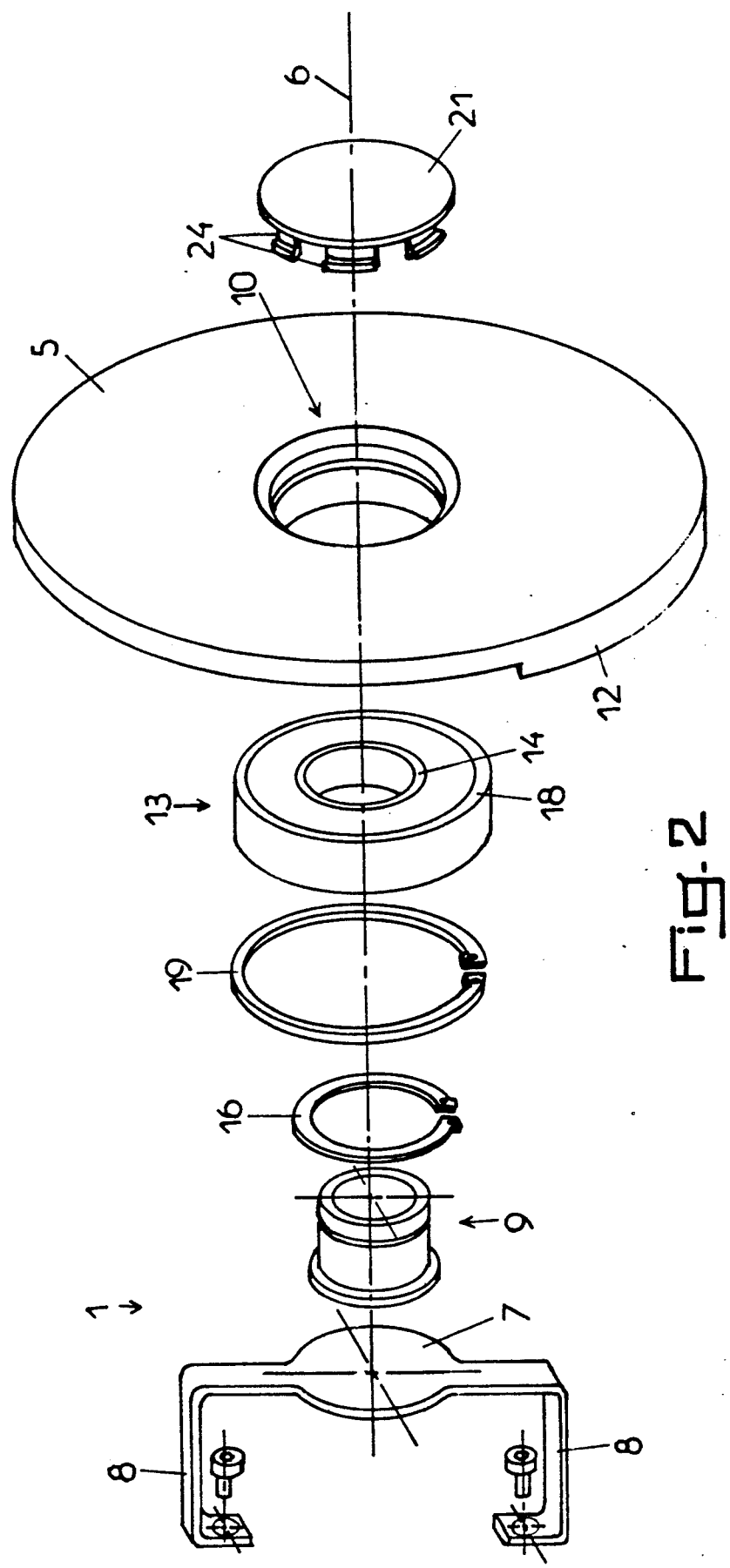
FIG. 2 is an exploded perspective view of the wheel cover shown schematically in FIG. 1, according to a first embodiment.

According to a first characteristic of the invention, shown in FIGS. 2 and 3 of the accompanying drawings, the securement and support device 1 is comprised, on the one hand, by a fixed base plate 7 which is fixed, either directly or by means of at least two arms 8, to the hub 2 or to the rim 3 of the wheel 4 of the vehicle and, on the other hand, of a support shaft 9 of cylindrical shape detachably connected to said base plate 7, and provided with an external circular abutment 17, the axis of rotation of said support shaft 5 being coaxial with the axis of rotation of the corresponding wheel 4.

The base plate 7 and the arms 8, preferably two in number, can be fabricated for example from a single piece and can be obtained by cutting off a corresponding metallic plate and consecutively bending the arms 8.

The securement of the arms 8 on the hub 2 or the wheel rim 3 as well as that of the support shaft 9 on the base plate 7 are effected by securement means known to those in the art such as for example, screwing, welding, cementing, etc.

Figure 4:
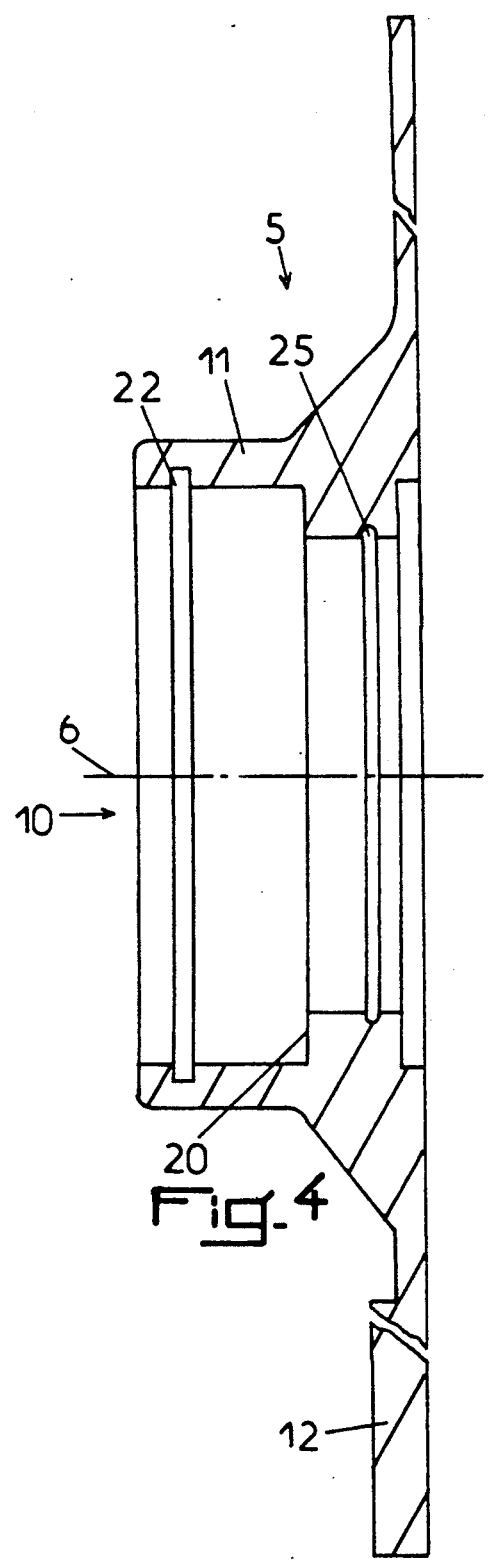
FIG. 4 is a side elevational and cross-sectional view of the shield element which is part of the wheel cover shown in FIG. 2.

As shown in FIGS. 2 and 4 of the accompanying drawings, the shield element 5 is in the form of a perforated disk provided, adjacent its central orifice 10, with a mounting ring 11, the diameter of said disk being substantially equal to the internal diameter of the wheel 4, so as to cover completely the rim 3 of said wheel 4 (FIG. 1). Moreover, the shield element 5 has a thickening 12 of material extending about only a portion of its surface and which can have various shapes such as, for example, a portion of a ring or even an angular section, from which results an asymmetric spacing of the mass of said shield element 5 about its axis of rotation 6.

According to another characteristic of the invention, the rotative connection between the support and securement device 1 of the shield element 5 is effected by means of roller bearings 13, needle bearings or the like, mounted, for example, grippingly, on the one hand, in the mounting ring 11 of said shield 5, and, on the other hand, on the support shaft 9 of said securement and support device 1 (FIG. 1). Nevertheless, the roller bearing 13 could also be mounted slidably on the support shaft 9, the securement and rotation of said support shaft 9 with the internal ring 14 of said roller bearing 13 being effected, for example, by means of a set screw with six hollow sides disposed in a radial screw-threaded opening 15 provided in the wall of hollow support shaft 9.

According to a characteristic of the invention, the external ring 18 of said roller bearing 13 is secured in the mounting ring 11 of the shield element 5 by means of an internal split ring 19 coacting with an internal abutment 20, in the form of a known internal detachable connection of said mounting ring 11.

According to a first embodiment of the invention, shown in FIG. 2 of the accompanying drawings, the internal ring 14 of the roller bearing 13 is secured on the support shaft 9 by means of an external split ring 16 disposed in a groove 23 of said support shaft and coacting with the external circular abutment 17, which is in the form, for example, of a peripheral detachable attachment of said support shaft 9.

In this case, the wheel cover comprises also a cover 21 disposed removably in the central opening 10 of the shield element 5 and permitting the provision of a flat and continuous external surface of said shield element 5.

This latter, as well as the cover 21, can preferably be of a plastic material known as ABS, which is to say a copolymer of acrylonitrile, butadiene and styrene, the shield element 5 being adapted to be made of a single piece with the mounting ring 11 and being obtained particularly according to an injection molding technique.

Thus, the mounting of the wheel cover on the wheel 4 of a vehicle consists, after securement of the support shaft 9 on the base plate 7 and the mounting of this latter on the hub 2 or rim 3 of a wheel 4, in conducting, for example, the following operations (FIGS. 2, 3 and 4):

emplacing the roller bearing 13 in the mounting ring 11 of the shield element 5, bearing against the abutment 20;

emplacing the internal split ring 19 in a corresponding circumferential internal groove 22 of the mounting ring 11 (FIG. 4);

mounting the assembly of the shield element 5 and roller bearing 13 on the support shaft 9, the internal ring 14 of the roller bearing 13 bearing against the external abutment 17 of said support shaft 9;

emplacing the external split ring 16 in a corresponding external circumferential groove 23 of the support shaft 9;

inserting the cover 21 into the opening 10 of the shield element 5 until the elastic tongues 24 of said cover 21 click into a corresponding internal groove 25 of said shield element 5, and emplacing designs, symbols and/or advertising text and/or information, particularly in the form of self-stick labels, on the external surface of the shield element 5.

Demounting said wheel cover would consist in effecting the preceding steps in the reverse order and performing the reverse operations.

Nevertheless, to demount the shield element 5, so as to change the advertising text and/or information and to replace one or several elements that have worn, it suffices to remove the cover 21 then to unlock and remove the external split rings 16.

Thus, changing the wheel elements 5 can be effected with a minimum of operations and in an extremely short lapse of time. Moreover, the use of split rings 16, 19 to assemble the wheel cover according to the invention ensures high reliability at the time of the mounting thus effected.

According to a second embodiment of the invention, shown in FIGS. 5 and 6 of the accompanying drawings, the mounting of roller bearing 13 on support shaft 9 is effected by means of a substantially annular intermediate member 26, disposed adjustably between the internal ring 14 of the roller bearing 13 and the support shaft 9 and delimited, on the one hand, by a perforated disk 27, whose diameter corresponds substantially to that of the internal ring 14.

Thus, the internal ring 14 of the roller bearing 13 will be blocked between the external circular abutment 17 of the support shaft 9 and the perforated disk 27.

According to a characteristic of the invention, and as shown more particularly in FIG. 5 of the accompanying drawings, the assembly of the intermediate member 26 with the support shaft 9 is effected, on the one hand, by means of a split ring 28 disposed in an external groove 23 of the support shaft 9 and extending partially into an internal groove 29 of the intermediate member 26 and, on the other hand, by means of a screw 30 engaging in an axial screw-threaded opening 31 of the support shaft 9, and securing the perforated disk 27 to said support shaft 9.

In this case, the mounting of the wheel cover on a wheel 4 consists, after emplacing the securement and support device 1 on the hub 2 or the rim 3 of said wheel 4 (FIGS. 5 and 6):

in positioning the ring 26 in the groove 23 of the support shaft 9;

in introducing the intermediate member 26 into the internal ring of roller bearing 13;

in emplacing the roller bearing 13 in the mounting ring 11 of the shield element 5, bearing against the abutment 20;

then in disposing the internal split ring 19 in a corresponding circumferential internal groove 22 of the mounting ring 11;

in slipping the assembly of shield 5—intermediate member 26—roller bearing 13—internal split ring 19 over the support shaft 9 until the ring 28 snaps into the groove 29 of the intermediate member 26;

and finally, in engaging the screw 30, preferably of the type with six hollow faces, into the screw-threaded opening 31 of the shaft and in screwing it until it locks.

Because of its construction, the wheel cover can, according to the invention, preferably be mounted partially in two distinct operations, permitting, in the first instance, to provide two subassemblies of elements, namely the securement and support device and the ring 28, on the one hand, and, the shield element 5, the roller bearing 13, the intermediate member 26 and the split ring 19, on the other hand.

These subassemblies can then be easily assembled together by simply slipping one onto the other and clipping, followed by screwing, this operation being adapted to be performed very rapidly. Similarly, the changing of the shield elements 5 and the maintenance of the wheel covers according to the invention can be effectuated in a minimum of time and with a minimum of operations.

Thus, the demounting of the shield element 5 is effected after removal of the screw 6, by sharp pulling movement, freeing the intermediate member 26 from the ring 28. In practice, it is thus possible to proceed with the replacement of one shield element 5 by another, so as to change the advertisement for example, in less than 20 seconds.

Furthermore, the assembly of the two subassemblies by means of the ring 28 and the screw 30, provides high reliability in use and prevents any accidental demounting of said shield element 5.

According to a supplemental characteristic of the invention, shown in FIGS. 1, 7 and 8 of the accompanying drawings, the wheel cover furthermore comprises an animation device 32, mechanical or electrical, secured to the shield element 5 and storing energy during rotation of the wheel 4, this energy being thereafter used when the wheel 4 stops, in the form, for example, of movement of a mobile decorative element 33.

The animation device 32 is principally constituted on the one hand by an input movement train, comprised of several successive coacting gears 34 to 38, permitting charging a spring 39 provided with a torque limiter by means of a roller 40 movably driven by the rim 3 of the wheel 4 and, on the other hand, by an output drive train 41, 42 consisting essentially of one or several gears permitting, when the wheel 4 is stopped, the actuation, by means of the spring 39, of at least one member 43 supporting a decorative and/or informative element 33, the independence of the two drive trains from each other being achieved by means of a free wheel device 44.

Thus, it is possible, as shown in FIG. 8 of the accompanying drawings, to displace a decorative element 33 relative to the shield element 5, thereby effecting animation by displacement, rotation, deformation, or the like, of at least one decorative element 33.

According to a further embodiment of the invention, not shown in the accompanying drawings, the animation device 32 is comprised, on the one hand, of an electrical generator driven by the rim 3 of the wheel 4 and charging a corresponding accumulator and, on the other hand, by an electric motor fed by said accumulator and actuating a movable decorative element 33, as the case may be, by means of a movement reduction system.

The charging of the accumulator will therefore be a function of the distance travelled by the vehicle, and can permit not only moving a decorative element 33 but also producing luminous effects.

Thanks to the invention, it is therefore possible to provide a wheel cover for vehicle wheels that can be used particularly as an advertising support and permitting the recognition and/or reading of said advertising disposed on said wheel cover by persons outside the vehicle even when the latter is in movement, because of the maintenance of a fixed angular position relative to the horizontal of the shield element 5 supporting said advertising and this no matter what the angular position of the wheel 4, said angular position of said shield element 5 corresponding to a positioning of the location of said advertising inscriptions and/or information.

Moreover, the field relationship of the screen element 5 relative to the horizontal, during movement of the vehicle, on the one hand, and, the movement of said decorative element 44 during stopping of said vehicle, on the other hand, will also serve to call attention of persons outside the vehicle when this latter moves through their field of vision.

The wheel cover according to the invention is particularly well adapted to transport and urban public vehicles, because of the relatively great size of the wheels and relatively low speed of movement of said vehicles.

Of course, the invention is not limited to the embodiments described and shown in the accompanying drawings. Modifications remain possible, particularly with respect to the construction of various elements or by substitution of technical equivalents, without thereby departing from the scope of protection of the invention.

We claim:

1. Wheel cover for the wheel of a vehicle, said wheel having a hub and a rim, the cover comprising a securement and support device (1) secured to the hub (2) or to the rim (3) of the wheel (4) and a substantially flat shield element (5), mounted on said device (1) for rotation and having an asymetric spacing of its mass relative to its axis of rotation (6), permitting said shield element (5) to maintain a fixed angular position relative to the horizontal, even during rotation of said wheel (4), the securement and support device (1) comprising a base plate (7) fixed to the hub (2) or to the rim (3) of the wheel (4) and a support shaft (9), of cylindrical shape, removably mounted on said base plate (7) and provided with an external circular abutment (17), there being a rotative connection between the securement and support device (1) and the shield element (5) comprised by a roller bearing (13), the mounting of the roller bearing (13) on the support shaft (9) being effected by means of an annular intermediate member (26) disposed adjustably between an internal ring (14) of the roller bearing (13) and the support shaft (9), and delimited by a perforated disk (27), whose diameter corresponds substantially to that of the internal ring (14).

2. Wheel cover according to claim 1, characterized int hat the shield element (5) is in the form of a perforated disk provided, adjacent its central opening (10), with a mounting ring (11), said shield element (5) also comprising a thickening of material (12) extending over only a portion of its surface.

3. Wheel cover according to claim 2, characterized in that an external ring (18) of said roller bearing (13) is secured in the mounting ring (11) of the shield element (5) by means of an internal split ring (19) coacting with an internal abutment (20) of said mounting ring (11).

4. Wheel cover according to claim 1, characterized in that the internal ring (14) of the roller bearing (13) is secured on the support shaft (9) by means of an external split ring (16) disposed in a groove (23) and coacting with the external circular abutment (17).

5. Wheel cover according to claim 4, characterized in that it comprises a cover (21) removably disposed in a central opening (10) of the shield element (5) and imparting a continuous flat external surface to said shield element (5).

6. Wheel cover according to claim 1, characterized in that the assembly of the intermediate member (26) with the support shaft (9) is effected by means of a split ring (28) disposed in an external groove (23) of the support shaft (9) and extending partially into an internal groove (29) of the intermediate member (26) and by means of a screw (30) engaging in an axial screw-threaded orifice (31) of the support shaft (9).

7. Wheel cover according to claim 1, characterized in that it comprises an animation device (32) secured to the shield element (5) and storing energy during rotation of the wheel (4).

8. Wheel cover according to claim 7, characterized in that the animation device (32) is comprised by an input drive train (34, 35, 36, 37, 38), comprised by several successive coacting gears, permitting charging a spring (39) provided with a torque limiter through a roller (40)

driven by the rim (3) of the wheel (4) and by an output drive train (41, 42) comprised by at least one gear permitting, when the wheel (4) stops, to actuate by means of the spring (39) at least one member (43) supporting a display element (33).

9. Wheel cover according to claim 1, characterized in that the securement and support device (1) as well as the shield element (5) are each of a single piece.

* * * * *